(12) United States Patent
Wnuk et al.

(10) Patent No.: US 7,396,460 B2
(45) Date of Patent: Jul. 8, 2008

(54) FILTER ELEMENT

(75) Inventors: Ralf Wnuk, Bexbach (DE); Seddik Lahbib, Forbach (FR); Markus Olschok, Neunkirchen (DE)

(73) Assignee: Hydac Technology GmbH., Neunkirchen/Saar (DE)

( * ) Notice: Subject to any disclaimer, the term of this patent is extended or adjusted under 35 U.S.C. 154(b) by 230 days.

(21) Appl. No.: 10/555,667

(22) PCT Filed: Apr. 14, 2004

(86) PCT No.: PCT/EP2004/003904

§ 371 (c)(1),
(2), (4) Date: Nov. 7, 2005

(87) PCT Pub. No.: WO2004/103525

PCT Pub. Date: Dec. 2, 2004

(65) Prior Publication Data

US 2007/0029244 A1    Feb. 8, 2007

(30) Foreign Application Priority Data

May 22, 2003    (DE)    ................. 103 23 075

(51) Int. Cl.
*B01D 35/06* (2006.01)
(52) U.S. Cl. ................. 210/223; 210/222; 210/355; 210/376; 210/411; 210/695
(58) Field of Classification Search ................. 210/222, 210/223, 355, 376, 411, 695
See application file for complete search history.

(56) References Cited

U.S. PATENT DOCUMENTS

| | | | |
|---|---|---|---|
| 2,184,243 A | | 12/1939 | Belyavin |
| 2,237,964 A | | 4/1941 | Haught |
| 4,444,659 A | * | 4/1984 | Beelitz et al. ............... 210/222 |

FOREIGN PATENT DOCUMENTS

| | | |
|---|---|---|
| DE | G 83 06 970.4 | 12/1983 |
| DE | 3812876 A1 | 11/1988 |
| DE | 40 30 084 A1 | 3/1992 |
| DE | 296 16 234 U1 | 1/1997 |
| EP | 0 968 039 B1 | 10/2002 |
| FR | 2 718 065 A1 | 10/1995 |

* cited by examiner

*Primary Examiner*—David A Reifsnyder
(74) *Attorney, Agent, or Firm*—Roylance, Abrams, Berdo & Goodman, L.L.P.

(57) ABSTRACT

A filter element (8), especially for use in backwash filtering systems, includes a filtering element through which a contaminated fluid flows in at least one direction (24). An intercepting device (62) has at least one rod-shaped permanent magnet or electromagnet (64) that at least partially removes magnetizable, especially ferritic portions from the fluid, before the fluid flows through the filtering element. A detaching device (68) removes the magnetizable portions from the intercepting device (62). The detaching device (68) is configured by a stripper ring (70) that travels along the rod-shaped magnet (64) and removes the portions retained by the intercepting device (62). When the filtering element is backwashed, the stripper ring (70), moved by the fluid flow, detaches the portions retained by the intercepting device (62). This filter element requires little construction space and allows for the automatic and energetically favorable removal of magnetizable, especially ferritic portions, when the filtering element is backwashed.

19 Claims, 3 Drawing Sheets

FILTER ELEMENT

FIELD OF THE INVENTION

The present invention relates to a filter element, especially for use in backflush filter devices, with a filtration part through which a fluid which has contaminants can flow at least in one direction. A capture device has at least one rod-like permanent magnet or electromagnet, which removes magnetizable, especially ferritic portions, at least partially from the fluid before it flows through the filtration part. A stripper removes the indicated portions from the capture device.

BACKGROUND OF THE INVENTION

EP-0 968 039 B1 discloses a backflush filter device for use of slotted hole screen tubular filter elements which can be accommodated in a housing with a filter inlet and an outlet for the fluid to be filtered. Flow through the filter elements for filtration or backflushing is possible in both directions. For backflushing, a drivable flushing arm has a fluid outlet for fouled fluid and can be moved in succession under the flow cross sections of the filter elements. In the known solution, at least some of the inserted slotted hole screen tubular filter elements are made conical. The structural length of the conical filter elements is at least ten times greater than the largest existing passage cross section for the fluid. The distance between the individual conical slotted hole screen tubular filter elements or between them and the cylindrical ones in the direction of their free ends is enlarged, with the result that the outflow space in the filter housing is enlarged, and moreover the escape resistance in filter operation is lowered. During backflushing, the conical slotted hole screen tube filter element presents a clear advantage over the cylindrical one, primarily due to the relatively larger exit cross section of the conical filter elements compared to the cylindrical ones for the same filter surface. Since the exit cross section for the conical filter elements is comparatively small relative to the entry cross section formed by the filter surface, that is, the free element surface, depending on the magnitude of the flow resistance of the slotted tube, a bottleneck forms in a large part of the system pressure drops off. Therefore, in the known solution small pressure losses occur, having a beneficial effect in terms of energy during backflushing.

During backflushing a large part of the volumetric throughput for conical and cylindrical filter elements is achieved fundamentally on the lower filter end. The volumetric flows decrease very quickly. The conical element is backflushed much farther. Also, the velocity gradient is less. With incorporation of the velocity profiles relative to the filter surface, an additional cleaning effect compared to cylindrical elements due to the conicity of the element is caused. This additional cleaning effect takes place carefully due to the essentially constant velocity attained when the conical filter elements are being cleaned off, prolonging the service life of these filter elements.

DE 40 30 084 A1 discloses a backflushing device can be backflushed with the dirty liquid is to be filtered, preferably in counterflow to the filtering direction. The known solution in the filter housing has a plurality of filter cells in a circular configuration can be connected to the sludge discharge using a flushing arm driven by a rotary drive individually or in small groups for backflushing. Although, in the known configuration in the backflushing process, the dirty liquid flows through the filter cells with a high turbulent velocity in the longitudinal direction and in the process dissolves and removes the deposited contaminants, the filtering and backflushing result can be improved. Since the filter elements are made cylindrical, they are located tightly next to one another in the filter housing and the free discharge space in the filter housing is accordingly small. In normal filter operation, the outflow resistance for the filtered fluid is then increased by the mutual influence of the cylindrical filter elements on one another. Accordingly, the pressure difference between the filter inlet and outlet is also increased, leading to an altogether poor energy balance in the described known solution.

Even if, as described in DE 83 06 970 U, the cylindrical filter elements are located at a clear distance from one another within the filter housing, especially during backflushing of these cylindrical filter elements a nonuniform fluid flow results, with the consequence that the fluid speed continuously increases within the cylindrical elements. This fluid flow likewise adversely affects the energy balance of the entire backflushing device.

DE 38 12 876 A1 discloses a conical filter element used for filtering and separating different substances and particles. A conically wound wire in the form of a helix or a helical cone is routed within support rods run onto one another. The penetrated conical construction in which the length-width ratio is in the range of 1 produces a type of funnel effect intended to enhance the separation performance. Even if the pertinent conical filtering and separating element were used in a backflushing device, in any case a larger exit cross section for the fluid relative to the entry cross section formed by the filter surface would not be achieved. Thus, increased flow resistances arise adversely affect the efficiency during backflushing. A device comparable to this arrangement is also disclosed by U.S. Pat. No. 2,237,964.

When the conical or cylindrical filter elements according to the above described prior art and the pertinent backflushing devices are used for filtration tasks, in ferritic portions can be found as contaminants in the fluid flow to a high degree, is for example often the case in cooling lubricant fluids are to be filtered, the described known solutions however reach their performance limits. They do filter the ferritic portions out of the fluid flow. The free filter pores of the respective filtration material used however quickly clog with the ferritic portions so that soon the filtration part of the respective filter element is blocked, regardless of whether it is made conical or cylindrical. Even if these filter elements are then used in backflushing filter devices in which counterflushing the respective filter element in the opposite throughflow direction from the clean side to clean off the filtration part is possible, the pertinent cleaning processes must then be undertaken exceptionally often. This requirement adversely affects the filtration performance of the respective device. On the other hand, agglutination or caking of the ferritic portions with the filter material of the filtration part often occurs. During backflushing, the ferritic contamination may also then remain joined to other contaminant portions in the filtration part, or damage to the filtration part occurs during backflushing, especially on its filtration layer or the slotted hole screen tube material of the filter element.

FR-2 718 065 A1 discloses a generic filter element removes contaminants from the fluid as throughflow proceeds from the inside to the outside. In the filter element with its cylindrical mat structure, there are two rod-shaped permanent magnets which trap magnetizable, especially ferritic portions, out of the fluid as it flows through the filter element. To remove the captured ferritic portions from the rod-like permanent magnets, a stripping plate encloses the rod-like permanent magnets on the outer circumferential side and is configured to be able to move within the filter element space by a hydraulic or pneumatic cylinder to clean-off in the direction of motion from top to bottom in the position of use of the filter element. The discharge of the ferritic portions takes place on the bottom of the filtration part held in the housing. After clean-off in the form of stripping, the working cylinder resets the stripping plate back into its initial or rest position above the actual filter element so that the known solution, especially due to use of the working cylinder, is designed to not only be geometrically large in the axial direction, but also requires additional energy for cleaning or stripping during operation of the respective working cylinder.

SUMMARY OF THE INVENTION

An object of the present invention is to provide improved filter element designs, especially intended for use in backflushing filter devices, such that when magnetizable, especially ferritic portions, occur in the fluid flow to be filtered, the described disadvantages, especially devices with large structures and requiring additional energy for stripping operation, do not arise.

This object is basically achieved by a filter element where the stripping means includes a stripping ring movable along the rod-shaped magnet to remove the portions which are held by the capture device. When the filtration part is being backflushed, the stripping ring is moved by the fluid flow and strips the portions which have been attached on the capture device. The magnetizable, especially ferritic portion component of the contaminants are to be filtered out of the fluid, which component adversely affects the filtration performance and the filter element material, cannot reach the filtration part with its selective filter material at all. Rather, the ferritic portion is separated beforehand in significant parts from the fluid flow. This separation takes place by capturing the magnetizable, especially ferritic portions, in a very effective manner even if these portions comprise a large part of the contaminants in the fluid which is to be filtered. Furthermore, the selectivity of the filtration part with its filter material can be oriented to the contaminants are to be conventionally expected, so that no special, especially costly adaptations are necessary. Rather, the filtration part can be selected within conventional framework. By way of the capture device, it is ensured that the selective material does not come into contact at all with the magnetizable contamination portions to any significant extent. Accordingly, the filter element design of the present invention can also be implemented especially cost-effectively and thus economically.

As the ring moves along the rod-like magnet, the ring effects removal of the portions which have been captured by the capture device. The stripping ring is positioned in normal filtration operation, preferably in the end area of the magnet, and in this way allows collection of the magnetizable material on the magnet. For any backflushing of the filter element in the throughflow direction becomes reversed and fluid flows through the filtration part from the clean side in the opposite direction, the cleaned fluid flow entrains the stripping ring then automatically cleans the captured magnetizable material off the rod-shaped magnet. On the pertinent magnetizable parts, other contaminant portions can be taken up at the same time, and are likewise stripped in this way.

If the magnet is formed from an electromagnet, the stripping can be further promoted by the de-energized state of the pertinent magnet. Possible remanence properties can be achieved by reversing the poles of the field of the respective electromagnet being used.

In an especially advantageous manner, the filter element with its filtration part is made conical, with the structural length of the element being at least ten times greater than the largest existing passage cross section for the fluid. Due to the described flow conditions in the conical filter element, this flow promotes the deposition of magnetizable material on the capture device. The jacket structure of the captured magnetizable, especially ferritic material on the capture device follows the conical jacket configuration of the filter element. The deposits on the capture device do not adversely affect the free flow cross section within the filter element to any significant degree because the free fluid flow paths remain constant in diameter over the length of the capture device. Conversely, it is found that due to the favorable flow conditions during backflushing with the conical filter element, it is sufficient if the capture device extends along half the filtration part on which the fluid enters and where the greatest passage cross section for the fluid flow exists. This configuration can however also be easily used for cylindrical filter elements, and the filtration part can be made in the manner of a slotted hole screen tube. It can also be a conventional, even an unfolded filter material in the form of a filter mat or the like.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1b is an end elevational view in section taken along line I-I of FIG. 1a;

FIG. 1c is an enlarged partial side elevational view of a detail designated as "X" in FIG. 1a;

DETAILED DESCRIPTION OF THE INVENTION

Figure 1A:
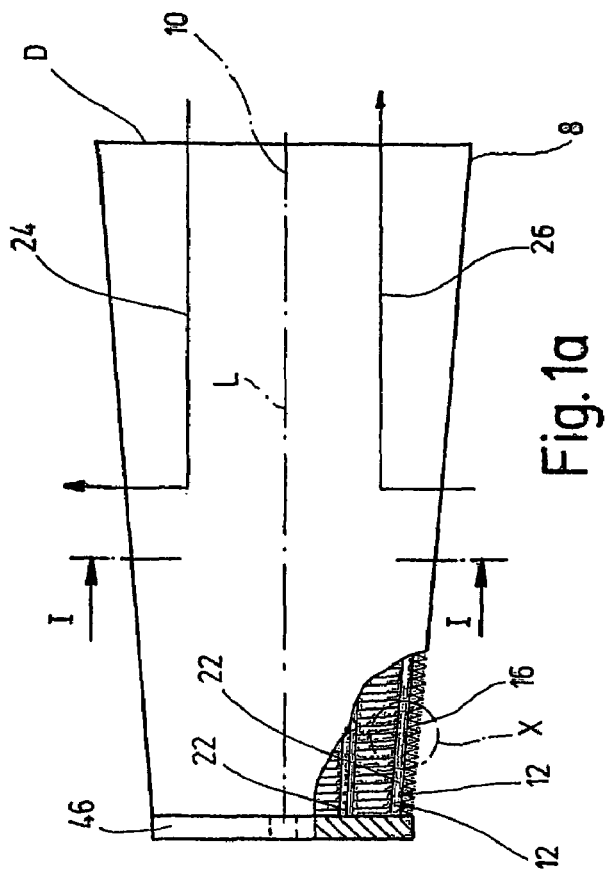
FIG. 1a is a schematic, partial cutaway, side elevational view of a filter element in the form of a slotted hole screen tubular filter element without the magnet capture device, according to an embodiment of the present invention.
Figure 1B:
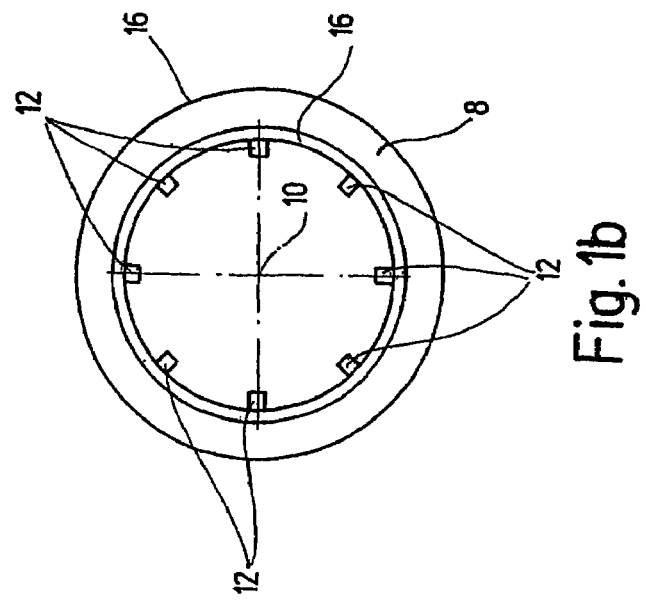
Figure 1C:
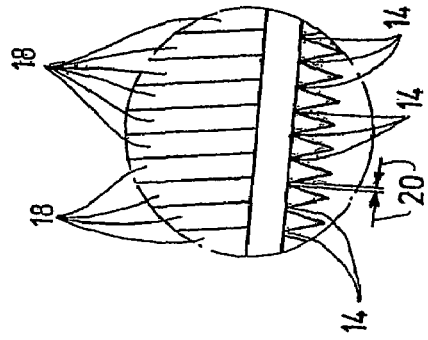

The slotted hole screen tubular filter element 8 shown in FIG. 1 has a longitudinal axis 10 and support rods 12 tilted toward the axis. Around the support rods, a wire profile 16 is wound in individual turns 18, leaving gaps 14 through the fluid can pass. In the area of each contact point of the wire profile 16 with the support rod 12, a weld is provided. The gap size is provided for free fluid passage, therefore the distance between two wire turns 18, is shown in FIG. 1c with arrows 20 which face one another.

As furthermore shown especially by FIG. 1a, the respective support rod 12 with its one end 22 is tilted toward the longitudinal axis 10 such that an overall tapering filter element 8 is formed with the turns 18 of the wire profile 16 decreasing in diameter in the direction of the tilted ends 22 of the support rods 12. This arrangement is also apparent from FIG. 1b. Instead of a single wire profile 16, as shown in the figures, optionally several successive wire profiles or wire profiles wound and located on top of one another (not shown)

can also be used, if this is necessary for the indicated filtration task. The length L of the slotted hole screen tubular filter element 8 measured in the direction of the longitudinal axis 10 is approximately 11 times greater than the greatest existing passage cross section D for the fluid on the end of the filter element 8 is the right as viewed in FIG. 1a.

The support rods 12 and the wire profile 16 are made of high-grade steel, with the support rods 12 being square in cross section and with the wire profile 16 being triangular. The gap widths selected and identified with the double arrow 20 in FIG. 1c can be matched to the size of the solid portions to be filtered out of the fluid, especially in the form of hydraulic oil. The filtered fluid passes freely through the gaps 14. The solid portions or dirt portions have been filtered out and retained by the turns 18 of the wire profile 16 remain within the filter element 8 or set partially in the gaps 14. As a result of using the slotted hole screen tubular filter element 8 for a longer and longer time, it becomes increasingly clogged and can no longer be used for filtration. In the pertinent case, in the reversed fluid passage direction the filter element 8 can be cleaned out by backflushing. In FIG. 1a in a schematic view, the direction of filtration from the inside to the outside is identified with an arrow 24, and the opposite direction of backflushing is designated with an arrow 26. For the sake of simpler representation the magnet capture device of the present invention is not shown in FIGS. 1a, b, c.

Figure 2:
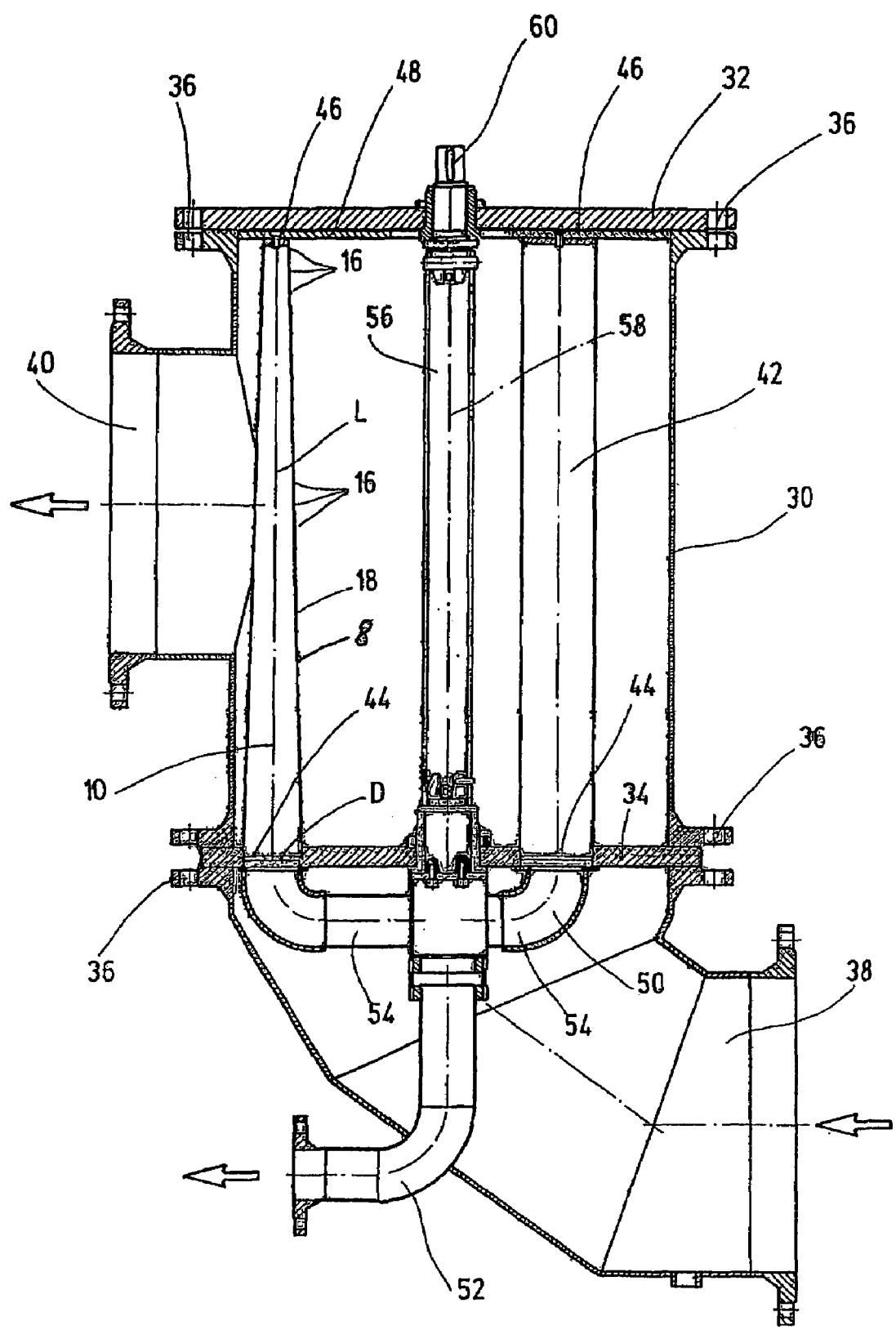
FIG. 2 is a side elevational view in section through a backflush filter device with cylindrical and tapering filter elements, according to an embodiment of the present invention.

The operation and use of the above described slotted hole screen tubular filter element using a backflushing filter device as shown in FIG. 2 are explained below.

The backflushing filter device shown in FIG. 2 has a cylindrical housing 30 with sealing covers 32, 34 fixed on the filter housing 30 by flange connections 36. The housing 10 of the backflushing device has a filter inlet 38 for the fluid is to be filtered and a filter outlet 40 for the filtered fluid. The fluid direction in filtering operation through the housing 30 is indicated in FIG. 2 with the corresponding arrows at the filter inlet 38 and filter outlet 40. In addition to the conical filter elements 8 located on the left when viewed in the direction of looking at FIG. 2, cylindrical filter elements 42 are also used. Both the conical slotted hole screen tubular filter element 8 and the cylindrical slotted hole screen tubular filter element 42 are divided into groups at distances from one another, and are configured in a plurality along cylindrical arcs within the filter housing 30. All the filter elements shown in FIG. 2 discharge or open with their inlet cross section D, that is to say, with their free opening, into cylindrical recesses 44 of the lower sealing cover 34. On its opposite end which is the respective other end, each conical or cylindrical filter element 8 and 42 is provided with sealing caps 46 with which each end of a wire profile 16 is welded. By the sealing caps, the elements are held on a plate-shaped intermediate piece 48 against the upper sealing cover 32 abuts from the top.

For the actual backflushing of the backflushing filter device, a drivable flushing arm 50 has, on its bottom, a connection in the form of a fluid outlet 52 for fouled fluid. The flushing arm 50 has two different arm segments 54 movable by a drive rod 56 in succession under the passage cross sections D of the conical and cylindrical filter elements 8 and 42. Therefore, backflushing takes place continuously with the actual filtration process, with only the selected filter elements 8, 42 being backflushed, from the outside to the inside, with the cleaned, filtered fluid formed during filtration with the other filter elements. The arm sections 54 of the flushing arm 50 extending under the respective free passage cross sections D. To drive the drive rod 56, especially in the form of a hollow shaft, on the top sealing cover 32 there is a spline shaft connection 60 by which the drive rod can be driven with the motor or the like for rotational revolution around the longitudinal axis 56.

Figure 3:
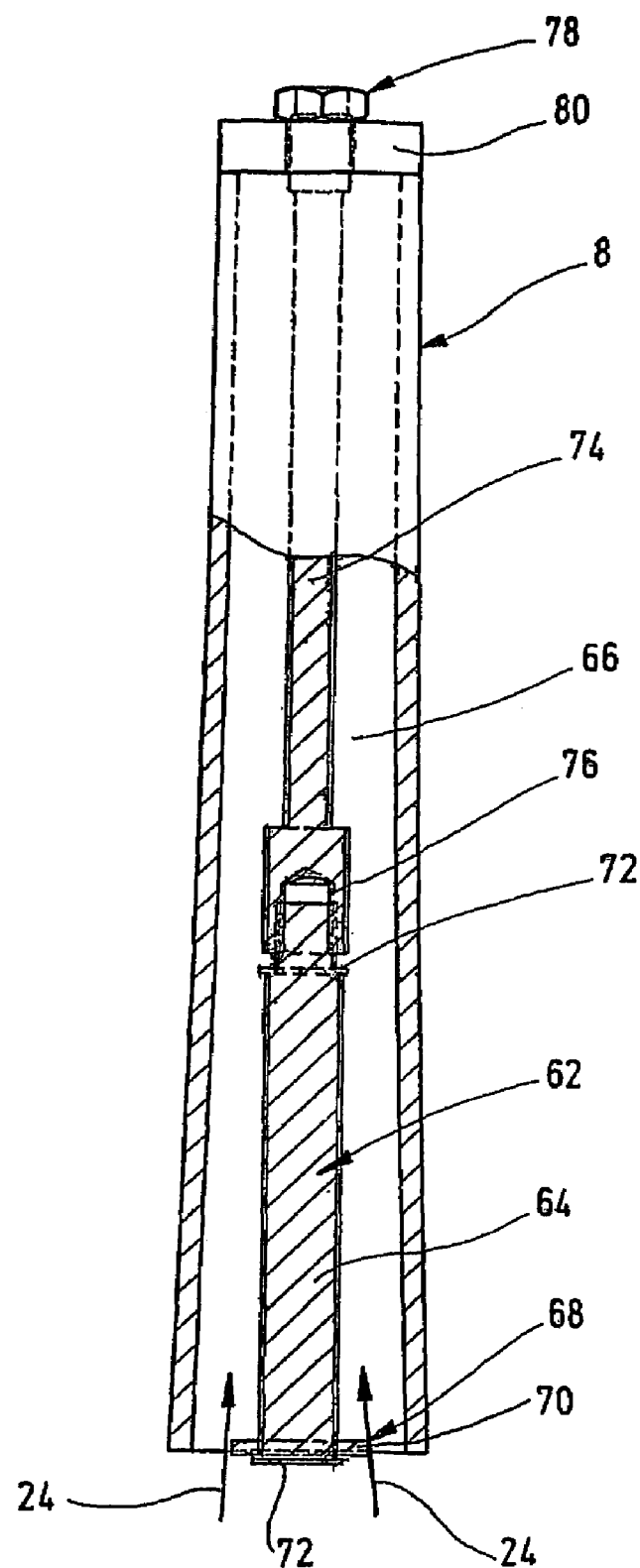
FIG. 3 is a partial, side elevational view, partially in section, of the internal structure of the filter element of FIG. 1a and FIG. 2 with the filter material being shown only schematically and not in detail.

As shown by FIG. 3 using a conical element 8, a capture device 62 is provided which at least partially removes magnetizable, especially ferritic portions (not shown) from the fluid, before it flows through the filtration part in the form of slotted hole screen tubular filter material in the direction of the arrow 24 from the inside to the outside. In the embodiment as shown in FIG. 3, the capture device 62 has a permanent magnet 64 which attracts the magnetizable, especially ferritic fluid portions, for example from a cooling lubricant flow to be filtered. The portions then settle on the permanent magnet 64 on its outer circumferential side. The cooling lubricant flow from which especially the ferritic fluid portions have been removed is then further filtered by the slotted hole screen tubular filter material as the filtration part and the pertinent contaminants are retained by the filter device.

As FIG. 3 furthermore shows, the permanent magnet 64 in the form of a rod extends along the longitudinal axis of the conical filter element 8. This magnet has a cylindrical outside circumferential surface so that on the inside the conical inflow space 66 is retained for the conical filter element. Instead of an individual permanent magnet 64, a plurality of individual magnets can comprise the pertinent permanent magnets (not detailed).

Furthermore, instead of the permanent magnet 64, an electromagnet of conventional design can also be used. The capture device 62 for the magnetizable, especially ferritic fluid portions has a stripping means 68 for removing the indicated portions from the capture device 62. The stripping means 68 includes a stripping ring 70 which removes the ferritic fluid portions which have been caught by the capture device 62 as it moves along the rod-shaped permanent magnet 64. The stripping ring 70 encloses the outer circumferential surface of the rod-shaped permanent magnet 64 with a definable radial play allowing the stripping ring 70 to move unobstructed along the outside contour of the magnet 64. To limit the free path of motion along the magnet 64, on two stops 72 are provided. As viewed in FIG. 3, the stripping ring 70 is in its bottom end position in which it has been moved against the lower stop 72.

This position corresponds to the backflushing position in which, by the fluid backflushing opposite the direction of the arrows 24, the clean flow originating from the other filter elements in conventional filtration operation resets the stripping ring 70 out of its uppermost end position in which it has moved against the upper stop 72, into its bottom stop position for cleaning off the magnet means. In the incident flow direction shown in FIG. 3 by the arrows 24 corresponding to conventional filtration operation of this filter element, the stripping ring 70 would accordingly be moved out of its position shown in FIG. 3 to the top again against the upper stop 72. Based on the already described throughflow conditions in the conical filter element, the permanent magnet 64 is located only over a length within the filter element is smaller than half the pertinent filter element length. To hold the permanent magnet 64, a magnet rod receptacle or receiver 74 is used which, likewise made rod-like, on its bottom end carries the permanent magnet over a screw section 76. On the top end, the magnet rod receiver 74 is fixed with a conventional hexagonal screw 78 on the top end of the conical filter element terminates in the end plate 80.

The capture device 62 with the permanent magnet 64 can also be used for a cylindrical filter element. Optionally, the magnet section can be enlarged over half the length of the filter element. For the conical filter element, it has been found that in a backflushing process the removal of the ferritic material from the permanent magnet 64 is also supported, so that a possibly stubborn build-up of ferritic material can also be cleaned off in this way.

Furthermore, the present invention need not be limited to filter elements in slotted hole screen tubular form. Other element shapes with other filter materials, for example with a conventional filter mat structure, can be kept free of ferritic portions in the selective material in this way.

While various embodiments have been chosen to illustrate the invention, it will be understood by those skilled in the art that various changes and modifications can be made therein without departing from the scope of the invention as defined in the appended claims.

What is claimed is:

1. A filter element for a backflush filter device, comprising:
    a filtration part through which contaminated fluid can flow in a filtering direction;
    a capture device mounted adjacent the filtration part and including at least one rod-shaped magnet for removing magnetizable portions from the contaminated fluid before the contaminated fluid flows through the filtration part; and
    a stripping ring movably mounted on said rod-shaped magnet for removing the magnetizable portions held on said rod-shaped magnet as said ring is moved by backflushing fluid flow during backflushing.

2. A filter element according to claim 1 wherein said rod-shaped magnet comprises a permanent magnet.

3. A filter element according to claim 1 wherein said rod-shaped magnet comprises an electromagnet.

4. A filter element according to claim 3 wherein said stripping ring is moved while said electromagnet is de-energized.

5. A filter element according to claim 1 wherein said rod-shaped magnet extends along a longitudinal axis of said filtration part.

6. A filter element according to claim 1 wherein said filtration part is conical, and has a structural length at least ten times greater than a largest passage cross section therein.

7. A filter element according to claim 1 wherein said filtration part is a slotted hole screen tubular filter element.

8. A filter element according to claim 1 wherein said rod-shaped magnet extends along one-half of a length of said filtration part adjacent an end thereof providing a fluid entry and having a greatest passage cross section.

9. A filter element according to claim 1 wherein
    said stripping ring is annular and surrounds said rod-shaped magnet loosely;
    in a rest position said stripping ring is located on a base part of said rod-shaped magnet; and
    during a filtering operation said stripping ring is positioned at an axial distance on said rod-shaped magnet from said base part.

10. A filter element according to claim 1 wherein said rod-shaped magnet has two axially spaced stops, said stripping ring being axially movable on said rod-shaped magnet between said stops.

11. A filter element according to claim 1 wherein
    said filtration part is porous and extends along a filtration part longitudinal axis with a contaminated fluid inlet at one axial end thereof and outlet passages in lateral sides thereof;
    said rod-shaped magnet extends within said filtration part along a magnet longitudinal axis; and
    said stripping ring loosely surrounds said rod-shaped magnet and is movable along said magnet longitudinal axis in response to fluid flow through said filtration part.

12. A filter element according to claim 11 wherein said filtration part longitudinal axis and said magnet longitudinal axis are coaxial.

13. A filter element according to claim 12 wherein said rod-shaped magnet has two axially spaced stops, said stripping ring being axially movable on said rod-shaped magnet between said stops.

14. A filter element according to claim 11 wherein said rod-shaped magnet has two axially spaced stops, said stripping ring being axially movable on said rod-shaped magnet between said stops.

15. A filter element according to claim 11 wherein said filtration part is a circular cylinder.

16. A filter element according to claim 11 wherein said filtration part is frustoconical.

17. A filter element according to claim 11 wherein said rod-shaped magnet extends along one-half of a length of said filtration part adjacent said one axial end thereof.

18. A filter element according to claim 1 wherein said rod-shaped magnet is fixedly mounted in said filtration part.

19. A filter element according to claim 1 wherein said stripping ring is movable relative to said rod-shaped magnet and said filtration part.

* * * * *

UNITED STATES PATENT AND TRADEMARK OFFICE
CERTIFICATE OF CORRECTION

PATENT NO. : 7,396,460 B2
APPLICATION NO. : 10/555667
DATED : July 8, 2008
INVENTOR(S) : Ralf Wnuk, Seddik Lahbib and Markus Olschok It is certified that error appears in the above-identified patent and that said Letters Patent is hereby corrected as shown below:

On the title page, item:

"(73) Assignee: "Hydac Technology GmbH" should read
--(73) Assignee: Hydac Process Technology GmbH--

Signed and Sealed this

Ninth Day of December, 2008

JON W. DUDAS
*Director of the United States Patent and Trademark Office*